United States Patent
Karaje et al.

(10) Patent No.: US 10,387,202 B2
(45) Date of Patent: Aug. 20, 2019

(54) QUALITY OF SERVICE IMPLEMENTATION IN A NETWORKED STORAGE SYSTEM WITH HIERARCHICAL SCHEDULERS

(71) Applicant: HEWLETT PACKARD ENTERPRISE DEVELOPMENT LP, Houston, TX (US)

(72) Inventors: Gurunatha Karaje, San Jose, CA (US); Ajay Gulati, San Jose, CA (US); Umesh Maheshwari, San Jose, CA (US); Tomasz Barszczak, San Jose, CA (US); Vanco Buca, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/277,779

(22) Filed: Sep. 27, 2016

(65) Prior Publication Data

US 2017/0017524 A1    Jan. 19, 2017

Related U.S. Application Data

(63) Continuation of application No. 14/748,179, filed on Jun. 23, 2015, now Pat. No. 9,483,187.

(Continued)

(51) Int. Cl.
*G06F 9/46*     (2006.01)
*G06F 9/50*     (2006.01)
(Continued)

(52) U.S. Cl.
CPC ............ *G06F 9/5027* (2013.01); *G06F 3/061* (2013.01); *G06F 3/067* (2013.01); *G06F 3/0659* (2013.01);
(Continued)

(58) Field of Classification Search
CPC ...... G06F 9/5027; G06F 3/061; G06F 3/0659; G06F 3/067; G06F 9/4881; G06F 9/5038;
(Continued)

(56) References Cited

U.S. PATENT DOCUMENTS 6,675,190 B1    1/2004   Schabernack et al.
6,938,256 B2    8/2005   Deng et al.
(Continued)

OTHER PUBLICATIONS

Pure Storage, Inc., "The Purity Operating Environment: Storage software born for flash," Jul. 26, 2013, <https://web.archive.org/web/20130726212513/http://www.purestorage.com/flash-array/purity.html>.

*Primary Examiner* — Camquy Truong

(57) ABSTRACT

Methods, systems, and computer programs are presented for allocating CPU cycles in a storage system. One method includes operations for receiving requests to be processed, and for associating each request to one task. A foreground task is for processing input/output requests, and the foreground task includes one or more flows. Each flow is associated with a queue and a flow counter value, where each queue is configured to hold requests. The method further includes an operation for selecting one task for processing by the CPU based on an examination of the number of cycles processed by the CPU for each task. When the selected task is the foreground task, the flow having the lowest flow counter is selected. The CPU processes a request from the queue of the selected flow, and the flow counter of the selected flow is increased based on the data consumption of the processed task.

20 Claims, 11 Drawing Sheets

Related U.S. Application Data

(60) Provisional application No. 62/058,015, filed on Sep. 30, 2014.

(51) Int. Cl.
  *G06F 3/06* (2006.01)
  *H04L 29/08* (2006.01)
  *G06F 9/48* (2006.01)

(52) U.S. Cl.
  CPC .......... *G06F 9/4881* (2013.01); *G06F 9/5038* (2013.01); *H04L 67/1097* (2013.01); *H04L 67/2842* (2013.01); *H04L 67/2852* (2013.01); *H04L 67/32* (2013.01); *H04L 67/322* (2013.01)

(58) Field of Classification Search
  CPC ............. H04L 67/1097; H04L 67/2842; H04L 67/2852; H04L 67/32; H04L 67/322
  See application file for complete search history.

(56) References Cited

U.S. PATENT DOCUMENTS

| | | | |
|---|---|---|---|
| 7,334,162 B1 | 2/2008 | Vakrat et al. | |
| 7,783,852 B2 | 8/2010 | Lahiri et al. | |
| 7,941,527 B1* | 5/2011 | Jacoby | H04L 43/026 370/229 |
| 8,041,808 B1 | 10/2011 | Becker | |
| 8,458,509 B1 | 6/2013 | Sreegiriraju et al. | |
| 8,848,723 B2* | 9/2014 | Sundararaman | H04L 47/621 370/412 |
| 9,160,684 B2 | 10/2015 | Sundararaman et al. | |
| 9,367,366 B2 | 6/2016 | Xiong et al. | |
| 9,558,250 B2 | 1/2017 | Sun et al. | |
| 9,871,855 B2 | 1/2018 | Likhtarov et al. | |
| 2004/0181594 A1 | 9/2004 | Suleiman | |
| 2006/0280119 A1 | 12/2006 | Karamanolis et al. | |
| 2007/0064711 A1 | 3/2007 | Wang et al. | |
| 2007/0226332 A1 | 9/2007 | Becker-Szendy et al. | |
| 2008/0222311 A1 | 9/2008 | Lee et al. | |
| 2009/0164274 A1 | 6/2009 | Narayanaswamy et al. | |
| 2010/0083262 A1 | 4/2010 | Gulati et al. | |
| 2010/0162253 A1 | 6/2010 | Jeong | |
| 2011/0265083 A1 | 10/2011 | Davis | |
| 2011/0314182 A1 | 12/2011 | Muppirala et al. | |
| 2012/0020368 A1 | 1/2012 | Sundararaman et al. | |
| 2012/0023498 A1* | 1/2012 | Sundararaman | H04L 47/621 718/102 |
| 2012/0060168 A1 | 3/2012 | Lee et al. | |
| 2012/0063313 A1 | 3/2012 | Zhou et al. | |
| 2013/0326064 A1 | 12/2013 | Gulati et al. | |
| 2014/0130055 A1 | 5/2014 | Guha | |
| 2014/0281121 A1 | 9/2014 | Karamcheti et al. | |
| 2015/0373049 A1 | 12/2015 | Sharma et al. | |
| 2016/0021172 A1 | 1/2016 | Mahadevan | |
| 2016/0044126 A1 | 2/2016 | Mahadevan et al. | |
| 2016/0077571 A1 | 3/2016 | Sagar et al. | |
| 2016/0092108 A1* | 3/2016 | Karaje | G06F 3/061 |
| 2016/0092272 A1 | 3/2016 | Karaje et al. | |
| 2016/0275422 A1 | 9/2016 | Chape et al. | |
| 2016/0291885 A1 | 10/2016 | Pendharkar et al. | |
| 2017/0010919 A1 | 1/2017 | Yerfule et al. | |
| 2017/0132040 A1 | 5/2017 | Yerfule et al. | |
| 2017/0177221 A1 | 6/2017 | Trehan et al. | |
| 2017/0177222 A1 | 6/2017 | Singh et al. | |
| 2017/0286516 A1 | 10/2017 | Horowitz et al. | |
| 2017/0293426 A1 | 10/2017 | Karaje et al. | |
| 2018/0081832 A1 | 3/2018 | Longo et al. | |
| 2018/0267728 A1 | 9/2018 | Booth et al. | |

* cited by examiner

QUALITY OF SERVICE IMPLEMENTATION IN A NETWORKED STORAGE SYSTEM WITH HIERARCHICAL SCHEDULERS

CLAIM OF PRIORITY

This application is a continuation of U.S. patent application Ser. No. 14/748,179, filed on Jun. 23, 2015, and entitled "QUALITY OF SERVICE IMPLEMENTATION IN A NETWORKED STORAGE SYSTEM WITH HIERARCHICAL SCHEDULERS," which claims priority from U.S. Provisional Patent Application No. 62/058,015, filed Sep. 30, 2014, and entitled "QUALITY OF SERVICE IMPLEMENTATION IN A NETWORKED STORAGE SYSTEM WITH HIERARCHICAL SCHEDULERS." These applications are herein incorporated by reference.

BACKGROUND

1. Field of the Invention

The present embodiments relate to methods, systems, and programs for allocating resources in a networked storage system, and more particularly, methods, systems, and computer programs for scheduling the use of resources using multiple schedulers to improve quality of service (QoS) in storage systems.

2. Description of the Related Art

Network storage, also referred to as network storage systems or storage systems, is computer data storage connected to a computer network providing data access to heterogeneous clients. Typically network storage systems process a large amount of Input/Output (IO) requests, and high availability, speed, and reliability are desirable characteristics of network storage. In addition to processing read and write IO requests, network storage systems need to perform other background operations required for maintaining these systems, such as garbage collection of obsolete data and compaction of data (e.g., merging contents of two half-filled segments into one full segment), creating snapshots of data, backup and replication procedures, etc.

However, if a network storage device spends most of its time processing read and write IOs, the background operations may not run efficiently, which in the long run will affect the performance and reliability of a network storage device. On the other hand, if background operations consume too many processing resources (e.g., CPU cycles) of the storage system, read and write IO performance will be degraded.

What is needed is a network storage device, software, and systems that provide for fair utilization of system resources to enable a storage system to process IOs with high performance, while reserving enough resources to perform background operations required for the ongoing operation of the network storage device.

It is in this context that embodiments arise.

SUMMARY

The present embodiments relate to solving one or more problems found in the related art, and specifically to efficiently process quality of service (QoS) services for efficient utilization of storage system CPU cycles among various storage systems. In one example, methods, system and apparatus are disclosed for processing efficient QoS in a networked storage system by implementing hierarchical schedulers. As will be described below, implementation of hierarchical schedulers allows a storage system to efficiently dedicate CPU cycles among various storage system tasks, such as background tasks that are utilized for ongoing system operation and maintenance and a foreground task utilized for processing IO requests, such as read and write requests to the storage system (e.g., servicing IO requests of applications). In some implementations, hierarchical schedulers refer to a system that implements more than one scheduler. For example, a higher level scheduler may be used to select scheduling between the foreground task and a number of background tasks. One or more lower level schedulers may be used to select between different foreground flows, which may be associated to various applications and/or volumes of a storage system. In one embodiment, selection of particular tasks or specific flows may further include utilization of a fair queuing process that enables on-going analysis of historical use of CPU cycles by task and the amount of data processed by select flows managed by the storage system. Further yet, the methods, systems, and apparatus described herein illustrate example methods for charging a cost to select tasks and flows, based on current and ongoing use. Charging a cost to the utilization of the CPU in the storage system provides for a way of maintaining a currency for charging to the different tasks based on resource utilization, so as to maintain a desired balance between performance of the overall storage system and performance demanded by select applications services by the storage system.

It should be appreciated that the present embodiments can be implemented in numerous ways, such as a method, an apparatus, a system, a device, or a computer program on a computer readable medium. Several embodiments are described below.

In one embodiment, a method includes operations for receiving a plurality of requests to be processed by the CPU, and for associating each request to one of a plurality of tasks. A first task of the plurality of tasks is for processing input/output (IO) requests of the storage system, the first task including a plurality of flows and each flow being associated with a queue and a flow counter value, and each queue being configured to hold requests. Further, the method includes an operation for selecting one of the plurality of tasks for processing by the CPU based on an examination of a number of cycles processed by the CPU for each task of the plurality of tasks that requires processing. Additionally, the method includes an operation for, when the selected task is the first task, selecting one of the plurality of flows having a lowest flow counter value among the flow counter values of flows that require processing by the CPU. Further yet, the method includes an operation for processing by the CPU a request from the queue of the selected flow, and the flow counter of the selected flow is increased based on a data consumption of the processed request.

In another embodiment, a system includes a central processing unit (CPU), a non-volatile memory (NVRAM) for storing incoming write requests, a solid state memory (SSD) configured as a read cache memory, and a hard drive (HDD) for permanent data storage. The CPU associates requests requiring processing by the CPU to one of a plurality of tasks, a first task of the plurality of tasks being for processing input/output (IO) requests of the storage system, the first task including a plurality of flows and each flow being associated with a queue and a flow counter value, each queue being configured to hold requests. Further, the CPU selects one of the plurality of tasks based on an examination of a number of cycles processed by the CPU for each task of the plurality of tasks that requires processing. In addition, the CPU, when the selected task is the first task, selects one of the plurality of flows having a lowest flow counter value among the flow counter values of flows that require processing by the CPU, and the CPU processes a request from the queue of the selected flow. The flow counter of the selected flow is increased based on a data consumption of the processed request.

In yet another embodiment, a non-transitory computer-readable storage medium, storing a computer program for allocating cycles of a CPU (central processing unit) of a storage system, includes program instructions for receiving a plurality of tasks to be processed by the CPU, and program instructions for associating each request to one of a plurality of tasks. A first task of the plurality of tasks is for processing input/output (IO) requests of the storage system, and the first task includes a plurality of flows, where each flow is associated with a queue and a flow counter value, each queue being configured to hold requests. The storage medium further includes program instructions for selecting one of the plurality of tasks for processing by the CPU based on an examination of a number of cycles processed by the CPU for each task of the plurality of tasks that requires processing, and program instructions for, when the selected task is the first task, selecting one of the plurality of flows having a lowest flow counter value among the flow counter values of flows that require processing by the CPU. Further yet, the storage medium includes program instructions for processing by the CPU a request from the queue of the selected flow, the flow counter of the selected flow being increased based on a data consumption of the processed request.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

Figure 1:
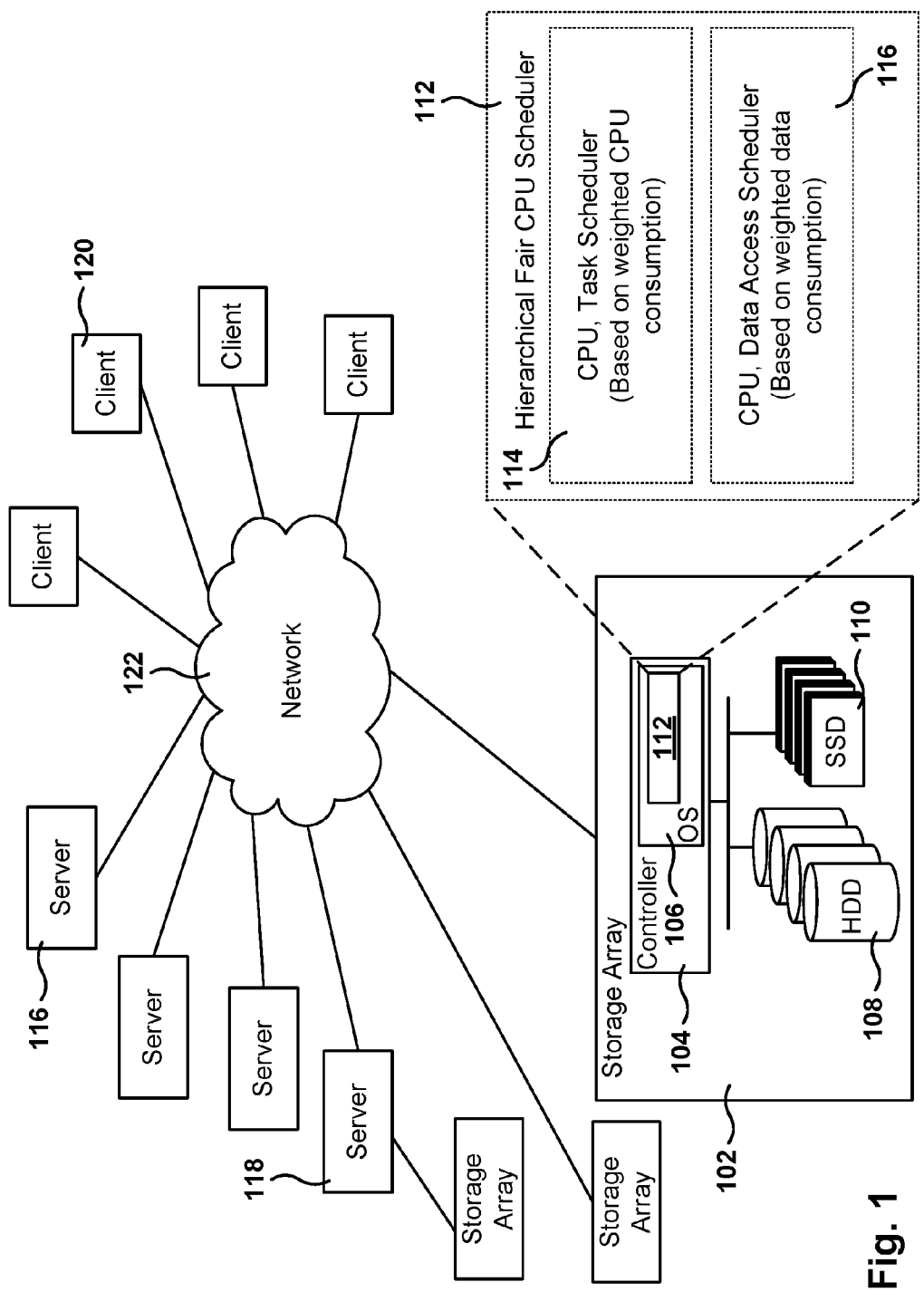
FIG. 1 depicts a system with network storage, according to one embodiment.

The following embodiments describe methods, devices, systems, and computer programs for implementing quality of service (QoS) in a networked storage system. In various examples described below, QoS can be implemented as a process, a method and/or a computer implemented method for efficient and fair utilization of storage system CPU cycles, which are shared among various storage system tasks. In one example, QoS is processed by a code executed by a processor of a storage system, which implements hierarchical schedulers for efficiently assignment of CPU cycles among various storage system tasks (e.g., ongoing system operations for background tasks and IO requests for foreground processing).

In some implementations, hierarchical schedulers refer to a system that implements more than one scheduler at one or more levels of processing abstraction. For example, a higher level scheduler may be used to select scheduling between the foreground task and a number of background tasks. Then, one or more lower level schedulers may be used to select/schedule different foreground IO requests (e.g., IO processing flows for serving applications and/or volumes configured for the storage system).

In one embodiment, selection of particular tasks or specific flows may further include utilization of a fair queuing process that enables on-going analysis of historical use of CPU cycles by task and amount of data processed by select flows managed by the storage system. Further yet, the methods, systems, and apparatus described herein illustrate example methods for charging a cost to select tasks and flows, based on current and ongoing use.

In some implementations, the fair queuing process accounts for more than one type of currency for charging based on resource utilization. For example purposes, as used herein, one currency of charge can relate to CPU cycles utilized by select tasks of the storage system, and another currency of charge can relate to data throughput, e.g., Megabytes per second (MB/s) processed by flows when processing IO requests. Thus, hierarchy of schedulers utilized by the storage system can implement configurable levels of QoS based on, for example, processing data based on CPU cycles and then MB/s, as a type process that accounts for dual-currency metrics. As will be described below, the settings for QoS may depend on the configuration of the system by end users. The configuration may, in some examples, allow users (e.g., information technology (IT) specialists or engineers) to set a desired performance level (e.g., input/output per second IOPS) for specific types of data, applications, volumes, clusters, etc. These settings for performance levels can, in some embodiments, be entered via user interfaces provided for the storage system, command line (CL) entry or the like. The storage system uses the desired performance level entries to configure the QoS settings, such that the currency of charge is adjusted to achieve the user's settings and/or requirements, while still providing for efficient operation of background operation of the storage system.

It will be apparent, that the present embodiments may be practiced without some or all of these specific details. In other instances, well-known process operations have not been described in detail in order not to unnecessarily obscure the present embodiments.

FIG. 1 depicts a system with network storage, according to one embodiment. The networked storage device, also referred to herein as a storage array 102 or a storage system, includes a controller 104 with a storage operating system 106, which is a multitasking system able to execute several tasks concurrently. One or more tasks process IO requests, and these tasks that process IOs are referred to herein as foreground tasks. Further, the amount of work involved in processing IO requests belonging to an application is referred to herein as a workload. Background tasks are tasks that do not cause a host initiator to wait for their output. For example, background tasks may include system maintenance tasks, such as a processing an alert when a resource consumption reaches a threshold, taking a scheduled snapshot, garbage collection (GC), etc. These foreground and background tasks contend for shared resources, such as CPU, disk, and flash memory. If resources are allocated on a first-come first-served (FCFS) basis, one task can utilize a large amount of resources and starve other tasks and workloads from being processed.

For example, migration of a virtual machine (VM) is an operation that usually requires heavy utilization of resources. If VM migration is given all the bandwidth possible, then other applications dependent on IO requests (e.g., such as remote video displays, database requests, video, streaming, etc.) may experience unsatisfactory performance or visible/noticeable degradation. It is noted that VM migration, as well as some other applications, are foreground workloads processed by the foreground task.

Embodiments presented herein provide fair scheduling of resources in order to provide adequate service to all tasks executing in the system. The fair scheduling of resources prevents badly behaved applications (e.g., applications that require excessive IO requests and/or may not be applications that take priority over others) from monopolizing the resources of the storage device, e.g., storage array 102.

In the example architecture of FIG. 1, one or more storage arrays 102 provide storage services to one or more servers 116, 118 (which are referred to herein as hosts) and to one or more clients 120. The configuration will depend on the implementation of the storage array and the demand by application. Network 122 provides transport for the data exchanges between the storage array 102 and servers 116 or clients 120. In addition, server 118 may be directly connected to a storage array without communicating through network 122. Storage array 102 includes one or more controllers 104, one or more hard disk drives (HDD) 108, and one or more solid state drives (SSD) 110, also referred to herein as flash cache. Additional examples regarding the system are provided below. In one embodiment, the storage operating system 106 executing in the controller includes a quality of service (QOS) manager 112 for implementing fair scheduling in the storage array 102. The fair use of resources allows the implementation of committed QoS levels specified and/or configured for the storage array.

In one embodiment, the Hierarchical Fair CPU Scheduler (HFCS) manager 112 includes at least two CPU schedulers: a task scheduler 114 and a data-access scheduler 116. The data-access scheduler 116 schedules IO requests generated by and for the foreground workloads. As explained in more detail below, the task scheduler 114 allocates the use of the CPU to the different tasks, foreground or background, based on the amount of CPU cycles (or any other metric related to CPU consumption utilized by the different tasks. Additionally, the data-access scheduler 116 allocates the IO resources to the different applications accessing the storage array based data processed (e.g., for example purposes only, based on the megabits per second (MBPS) consumed by the different applications, or based on the megabits consumed by the different applications, or throughput, or amount of data processed).

As used herein, the use of the two types of schedulers for allocating resources in the storage system is referred to as a dual-currency system, because two different types of metrics are utilized for the allocation of resources. It is noted that there can be also other types of schedulers in the system that utilize different scheduling criteria, such as first come first serve (FCFS). Furthermore, there may be additional schedulers that add additional levels of currency, for additional control and handling of storage system QoS demands.

Figure 2:
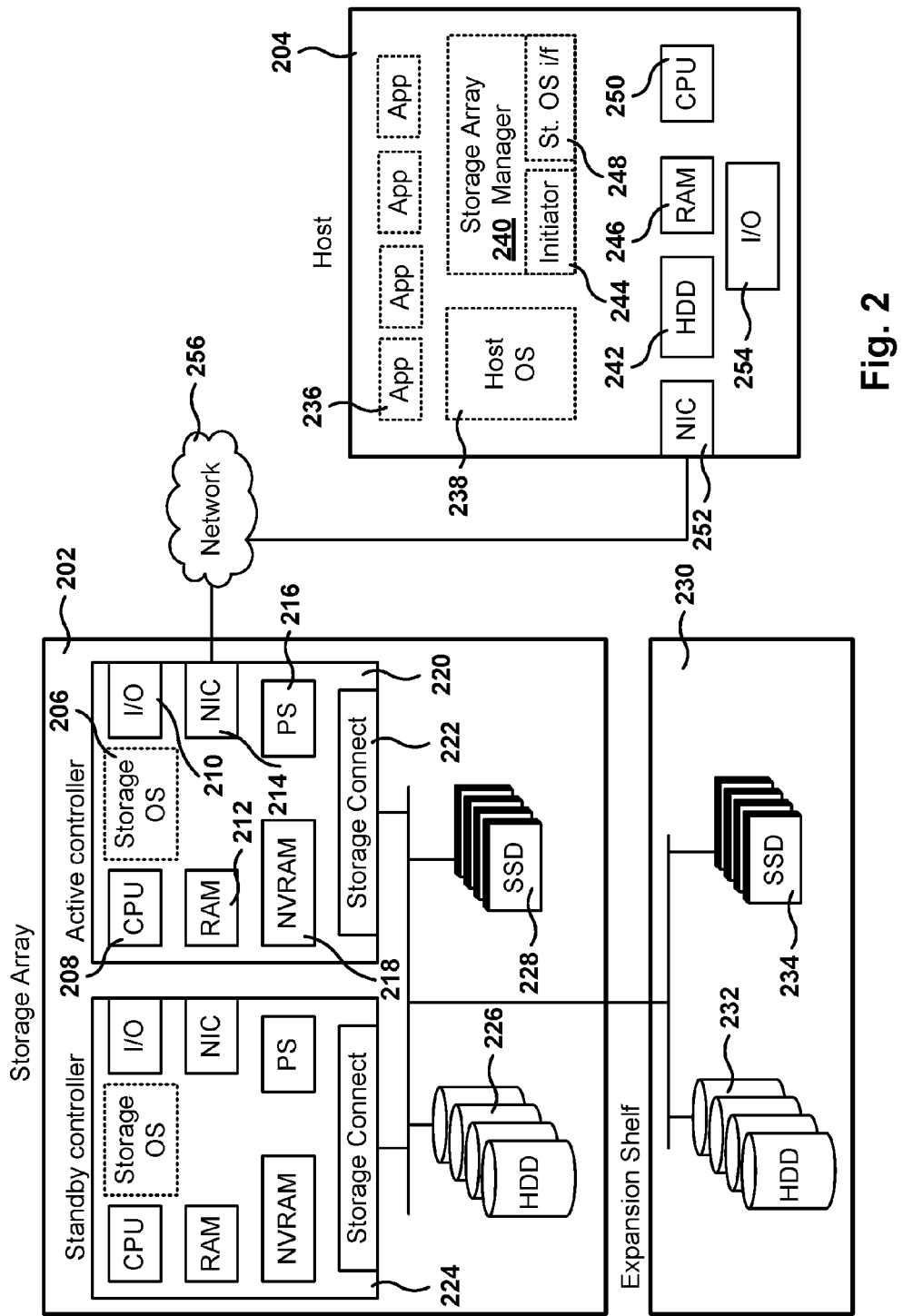
FIG. 2 illustrates the architecture of a storage array, according to one embodiment.

FIG. 2 illustrates an example architecture of a storage array 102, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

As used herein, SSDs functioning as flash cache, should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. The storage operating system 206 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides in increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 206 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

The active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, standby controller 224 includes the same components as active controller 220.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 256, and the storage array 202 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 202 to applications 236. Storage array manager 240 includes an initiator 244 and a storage OS interface program 248. When an IO operation is requested by one of the applications 236, the initiator 244 establishes a connection with storage array 202 in one of the supported formats (e.g., iSCSI, Fibre Channel, or any other protocol). The storage OS interface 248 provides console capabilities for managing the storage array 202 by communicating with the active controller 220 and the storage OS 206 executing therein.

To process the IO requests, resources from the storage array 202 are required. Some of these resources may be a bottleneck in the processing of storage requests because the resources are over utilized, or are slow, or for any other reason. In general, the CPU and the hard drives of the storage array 202 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

The hard disks may also become a bottleneck because the inherent access speed to data is slow when compared to accessing data from memory (e.g., NVRAM) or SSD 228. Embodiments presented herein are described with reference to CPU and HDD bottlenecks, but the same principles may be applied to other resources, such as a system with insufficient amount of NVRAM.

It should be understood, however, that specific implementations may utilize different modules, different protocols, different number of controllers, etc., while still being configured to execute or process operations taught and disclosed herein. As such, the example structure of FIG. 2 should not be interpreted to be exclusive or limiting, but rather exemplary or illustrative.

Figure 3:
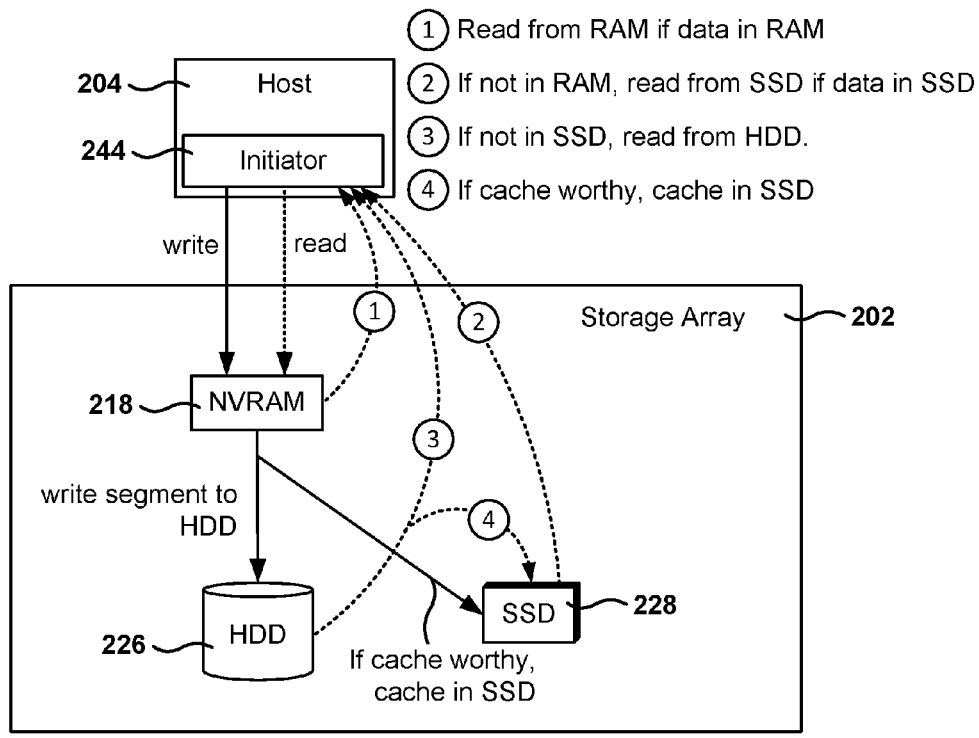
FIG. 3 illustrates the read and write paths within the storage array, according to one embodiment.

FIG. 3 illustrates the read and write paths within the storage array, according to one embodiment. Regarding the write path, the initiator 244 in the host 204 sends the write request to the storage array 202. As the write data comes in, the write data is written into NVRAM 218, and an acknowledgment is sent back to the initiator (e.g., the host or application making the request). In one embodiment, storage array 202 supports variable block sizes. Data blocks in the NVRAM 218 are grouped together to form a segment that includes a plurality of data blocks, which may be of different sizes. The segment is compressed and then written to HDD 226. More details are provided below regarding the transfer of data from the NVRAM 218 with reference to FIG. 4. In addition, if the segment is considered to be cache-worthy (i.e., important enough to be cached or likely to be accessed again) the segment is also written to the SSD cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 202. The requested data may be found in any of the different levels of storage mediums of the storage array 202. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

Figure 4:
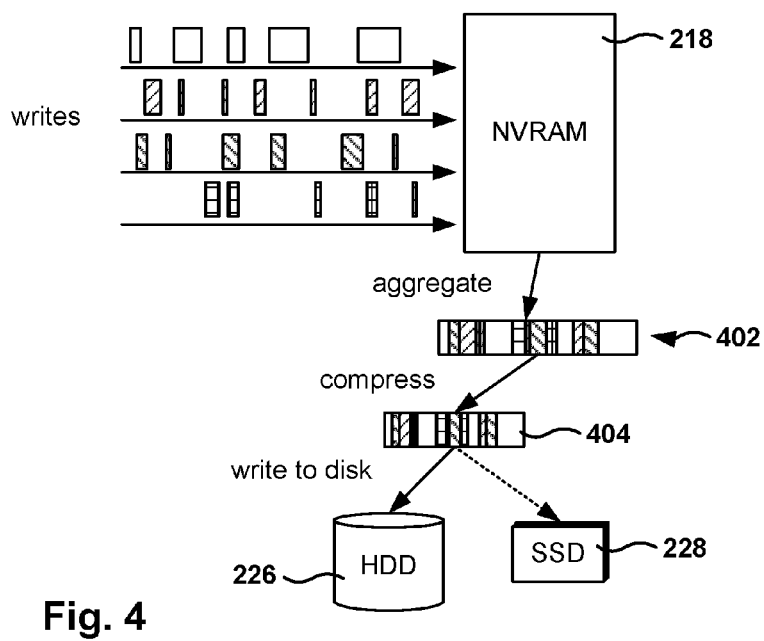
FIG. 4 illustrates the segmentation and compression of write data blocks before saving in hard disk, in accordance with one embodiment.

FIG. 4 illustrates the segmentation and compression of write data blocks before saving/writing to hard disk, in accordance with one embodiment. The different blocks arrive from one or more hosts to the storage array and then the blocks are stored in NVRAM 218. The incoming blocks are then aggregated into a segment 402, by concatenating the receiving blocks as they arrive to the NVRAM. It is noted that the blocks may have different sizes in one embodiment. The segment 402 is compressed 404 before transmittal to the disk, which results in time savings for the transmittal and savings in the space utilized in the hard drives 226. As noted above, if the data is cache-worthy then the data is also written to flash cache 228. This architecture is very efficient for random writes, as the data is not sorted before being sent to the hard drives, as it is often done in other storage architectures. Here, the data is fluently captured, segmented, compressed, and then sent to the drives, which results in a fast write path for the incoming data.

Figure 5A:
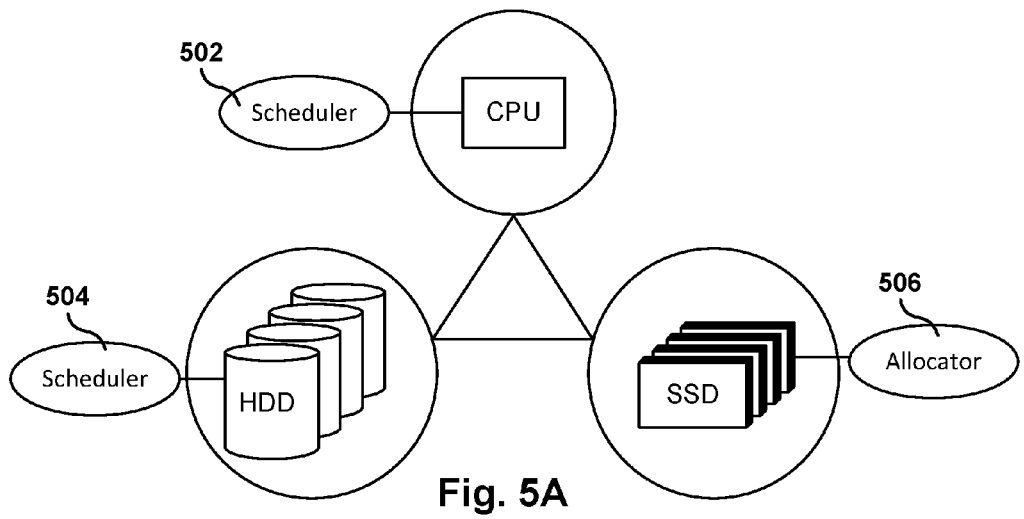
FIG. 5A illustrates a high level architecture for implementing Quality of Service (QOS) in a storage device, according to one embodiment.

FIG. 5A illustrates a high level architecture for implementing Quality of Service (QOS) in a storage device, according to one embodiment. In one implementation, three elements for the storage performance are presented in FIG. 5A: the CPU, the hard drives, and the cache. With regard to resource allocation, in general, the CPU and the hard drives are resources which can be overwhelmed if the storage array becomes very busy. One or more schedulers 502 are used to determine the order in which the different tasks in the storage array are allocated CPU processing time. Additionally, one or more schedulers 504 are utilized to determine which IO requests are given time for IO operations.

An allocator 506 is used to determine how much cache is assigned to each volume. In one embodiment, a volume is a single accessible storage area, reserved for one application or one host, or for a group of users of an organization or to segment/separate types of data for security or accessibly. Volumes may be referred to herein as flows, as a flow is associated with a type of data or application, which is configured for a volume.

In one embodiment, the cache is not a bottleneck for processing IO requests because of the cache's fast read and write speeds, but the same principles presented herein for scheduling CPU may be applied for scheduling access to the SSD cache. For example, if the amount of cache in a system is limited and applications compete for space in the cache, an allocator may be implemented for controlling the access to the SSD cache.

In some embodiments, the SSD is not a bottleneck, but the SSD is a precious resource because SSD is expensive and because flows having more data cached will be served faster. In a system, there can be four to five percent of the overall storage capacity as cache. For example, if a storage array has a capacity of 50 TB, then there could be 2 TB of SSD. The allocation of SSD space among the different applications is important for their relative performance. In some embodiments, additional flash cache may be added to improve performance, but given a particular configuration the amount of flash cache may still be far lower than the amount of capacity provide by disk.

In a system with unfair allocation of CPU cycles, problems may arise. For example, the workload in one foreground flow may affect the workload of other foreground flow. In one example, a VM being transferred from one host to another host will result in large write requests to the array (e.g., 64K or bigger). Simultaneously, a Virtual Desktop Infrastructure (VDI) session may be sending small write requests to the array (e.g., less than 32K blocks).

As expected, processing large write requests consumes more CPU cycles than small write requests. If the storage OS treats all requests equally, regardless of their CPU consumption, the VM transfer workload, with its large write requests, has an unfair advantage over the VDI workload. This results in increased latency for the VDI workload. It is noted that it is natural for one workload to experience increased latency in the presence of other workloads due to sharing of resources. However, due to unfair sharing of the CPU, the latency increase may be severe for resource-constrained workloads.

In another example, a test was performed where two write workloads always have outstanding write requests in respective queues having equal depth. The first workload produces small write requests (e.g., 4K), while the second workload produces large write requests (e.g., 256K). During the test, the sizes of the requests were not taken into consideration when allocating resources. The results showed that the write throughput for the workloads is proportional to their write-request sizes. This means that just by increasing the write request size, a workload could extract more write throughput from the system.

In other tests, it was observed that foreground workloads may affect background tasks, where the foreground workloads overloaded the system and starve the background tasks from executing, which in the long term resulted in the performance degradation of the array. In one specific example, a foreground workload overloads the system and causes resource starvation for GC. Due to the CPU starvation, GC cannot compact segments in timely fashion resulting in a low amount of free segments in the system. As the system gets low on free segments, a backpressure mechanism is triggered to slow down the incoming IOs so as to give breathing space to GC. This causes large delays in the processing of IO requests.

Conversely, background tasks may affect the foreground workloads. For example, uncontrolled CPU consumption by a replication task to find out modified blocks in a generation affects incoming write requests directly and indirectly. It affects directly by taking away CPU from processing write requests, and it affects indirectly by taking away CPU from other background tasks that generate free resources, such as GC, NVRAM drain, etc.

Figure 5B:
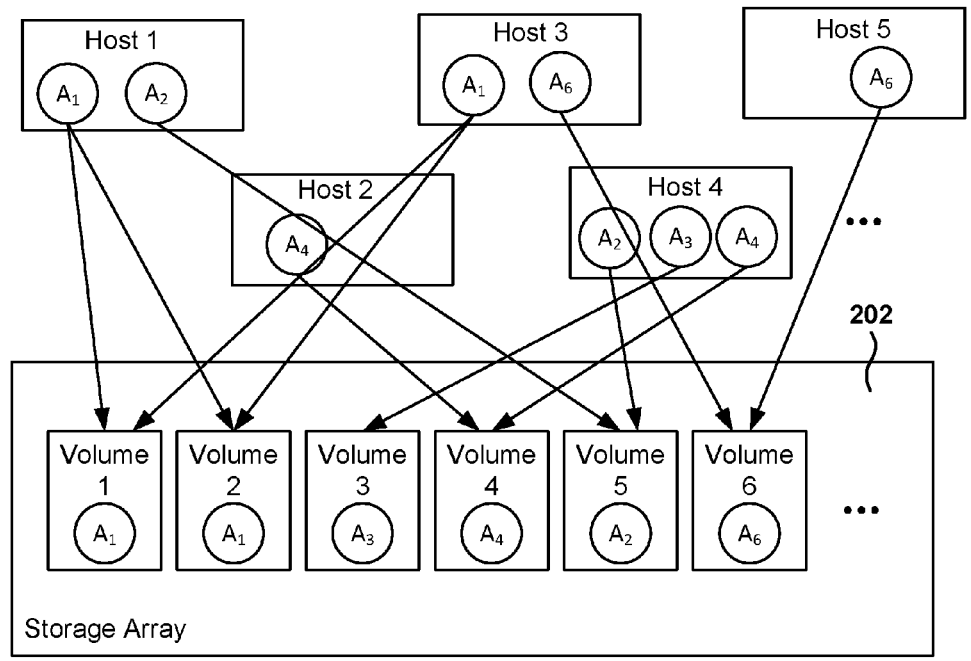
FIG. 5B illustrates the assignment of volumes to applications, according to one embodiment.

FIG. 5B illustrates the assignment of volumes to applications, according to one embodiment. In general, a plurality of hosts may execute a plurality of applications as designated as A1 to A6, which may be assigned one or more volumes or flows in the storage array 202. As the different applications and the different hosts access the storage array, competition for array resources takes place. The goals for a fair scheduling of resources may include fair allocation of resources to the different tasks in the array, isolation of badly behaved workloads and tasks, and providing support for user control on the scheduling of resources.

A properly behaved scheduler ensures fairness in resource allocation (e.g., CPU cycles, disk IO) between foreground workloads, and fairness in resource allocation between foreground workloads and background tasks. In some embodiments, a dynamic adjustment of the priority of certain background tasks may be performed when needed. For example, in response to over-consumption of a certain resource, the importance of a background task that generates more of the certain resource may be increased.

Figure 6A:
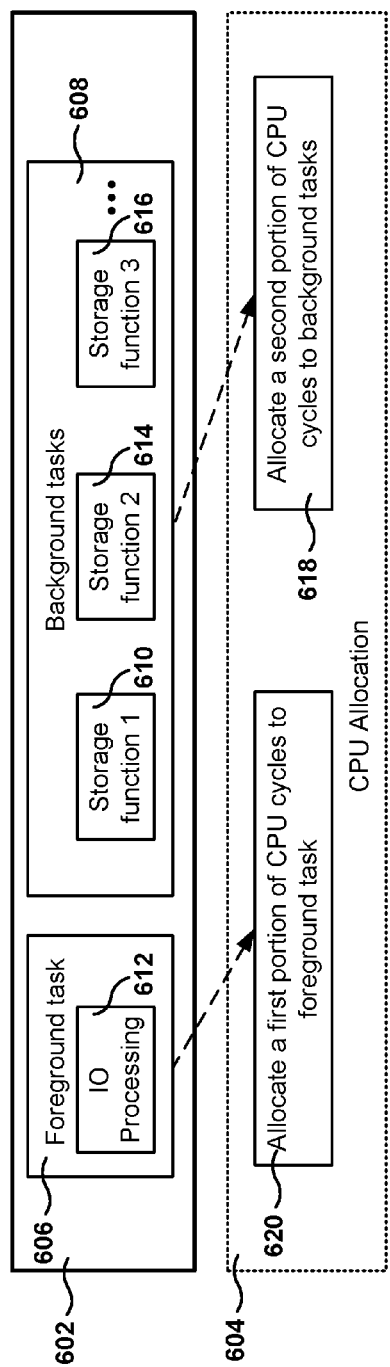
FIG. 6A is a high level diagram of the hierarchical scheduler according to one embodiment.

FIG. 6A is a high level diagram of the hierarchical scheduler according to one embodiment. The storage array tasks 602 include foreground task 606 and background tasks 608. As previously stated, foreground task 606 refer to the processing of IO requests 612.

The storage array may have a CPU with multiple cores (e.g., 2, 4, 8, 12, 16, 20, 24, 44 cores, etc.), and, in one embodiment, threads are created within each CPU core for processing requests. These threads are referred to herein as worker threads. For example, one thread may be created per CPU core, but multiple threads per CPU core are also possible. The threads are constantly running as long as there is work to do, i.e., a request needs to be processed.

Background tasks are tasks created in the storage system for general operations in the array. The background tasks may arise in response to certain events such as: consumption of a resource reaching a threshold, periodicity to ensure metadata consistency, a schedule to take a snapshot becoming ready, etc. In one embodiment, a fair CPU scheduler 604 fairly allocates CPU cycles to background tasks 618 and to foreground workloads 620. In order to ensure fairness between background tasks and foreground workloads, fair CPU scheduler 604 identifies tasks waiting to be executed and allocates resources to these tasks fairly.

Fairness means that any single background task or foreground IO processing cannot dominate CPU utilization.

Additionally, any single foreground workload cannot dominate in getting Input/Outputs Per Second (IOPS) or throughput from the system. In one embodiment, fairness means proper assignment of resources in terms of data consumption, where the data consumption may be measured as megabytes accessed or megabytes per second (MBPS) delivered by the different workloads.

In one embodiment, if the system administrator of the storage array does not specify any performance parameters for any of the volumes, then the default scheduling mechanism is used to ensure equal access by all applications. However, if the system administrator configures performance guidelines for the different flows, the scheduler uses these configured parameters to allocate resources among the different foreground flows. The settings by the administrator therefore define what is believed fair, for the given implementation (e.g., types of applications running, importance of applications or data, etc.).

Figure 6B:
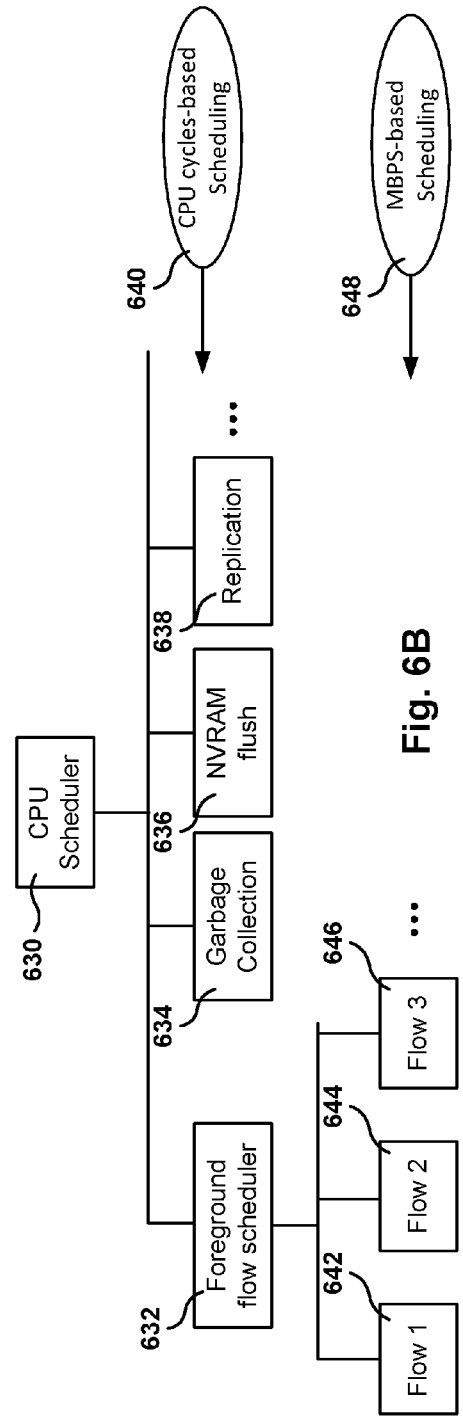
FIG. 6B is a detailed scheduling hierarchy, according to one embodiment.

FIG. 6B is a detailed scheduling hierarchy, according to one embodiment. The scheduler knows about the relative importance of the tasks to be performed, including configured user parameters regarding priority/importance for allocation. The CPU scheduling system includes a hierarchy of schedulers that operate at different levels. It is a hierarchy of schedulers because the scheduling is done in several phases in an ordered way. The CPU scheduling system determines the order in which tasks are processed, i.e., assigned CPU time. Although the embodiments presented herein referred to the allocation of CPU, the same principles may be applied to the allocation of hard drive resources, or any other type of resources in the storage array.

In one embodiment, each scheduler operates on a schedulable entity, where schedulable entities are any IO request (for performing an IO request) or any work request (for performing a background task). Maintaining multiple levels of schedulers enables achieving fairness in multiple dimensions, e.g., foreground task versus background tasks, access to hard disk by different applications, etc. The objective of the hierarchy of schedulers is to select the most eligible IO or work request that is waiting for a resource (e.g., a queued task) and allocate the resource to the request.

In one example, there are two kinds of schedulers in the hierarchy: schedulers that select another scheduler, and schedulers that select a request to be allocated with CPU time. Fairness may be configured at every level and by all schedulers or at select levels or schedulers. The overall goals of the scheduling system are to obtain fairness among the different tasks in the storage array, and to provide controls to the user for assigning priorities to different tasks, and to flows of foreground flow processing.

At the root is the CPU scheduler, also referred to herein as the root scheduler 630. In some embodiments, there may be other schedulers above the root scheduler 630, which may then be designated as the root. However, in this example, the mission of the root scheduler 630 is to select a task for allocating CPU. In one embodiment, each task has its own scheduler, as discussed in more detail below with reference to FIG. 6C. Therefore, CPU scheduler 630 is a scheduler that selects another scheduler.

One goal of the root scheduler 630 is to ensure fairness between foreground and background tasks. For example, it would be unsatisfactory to have a background task using so much CPU that the foreground workloads would not obtain enough CPU to provide adequate performance. Similarly, it would be unsatisfactory to have too many user requests to starve the background tasks from CPU time.

When the root scheduler selects a task, the corresponding scheduler is invoked to select a request for assigning CPU time. Regarding foreground workloads, fairness means not having one volume consume too many resources so other volumes are starved for CPU. For example, if one flow increases its load temporarily, the increase should not have a major impact on the performance of other flows. The foreground flow scheduler 632 selects which flow is to be served next, i.e., which flow scheduler will be invoked next.

In one embodiment, the CPU scheduler 630 selects a task based on the amount of CPU cycles consumed over time by that task. More details are provided below with reference to FIGS. 6C and 10A. For some types of requests, there is a fix overhead and a variable consumption of resources. For example, for a write request there is a fix amount of overhead regarding the processing the incoming request, writing the data to NVRAM, and sending the acknowledgment back to the initiator. Additionally, there is a variable component that depends on the size of the data to be written. This means compression of the data and writing the data to HDD.

For example, if one application is writing 4 Kb blocks and another application is writing 256 Kb blocks, when it comes to flushing the NVRAM to disk, the CPU utilization is directly proportional to the amount of data being sent to disk. In one embodiment, the foreground flow scheduler 632 selects which flow will be served next based on the amount of data previously consumed by that flow. In one embodiment, the amount of data consumed is measured in megabytes, and in another embodiment it is measured in megabytes per second.

Therefore, two different metrics are used at the first level and at the second level of the hierarchical scheduler. At the second level, data consumption is used as this is one of the key performance metrics for a storage system and for prioritizing the different foreground workloads. At the first level, data consumption does not make sense for background activities, therefore, the amount of CPU consumed is used for scheduling because it provides a good metric for balancing the foreground task with the background tasks. This dual criterion is referred to herein as a dual currency (e.g., CPU cycles, data consumed) for scheduling tasks. It is noted that in some embodiments, scheduling a request means assigning the request to be executed by a CPU thread.

Figure 6C:
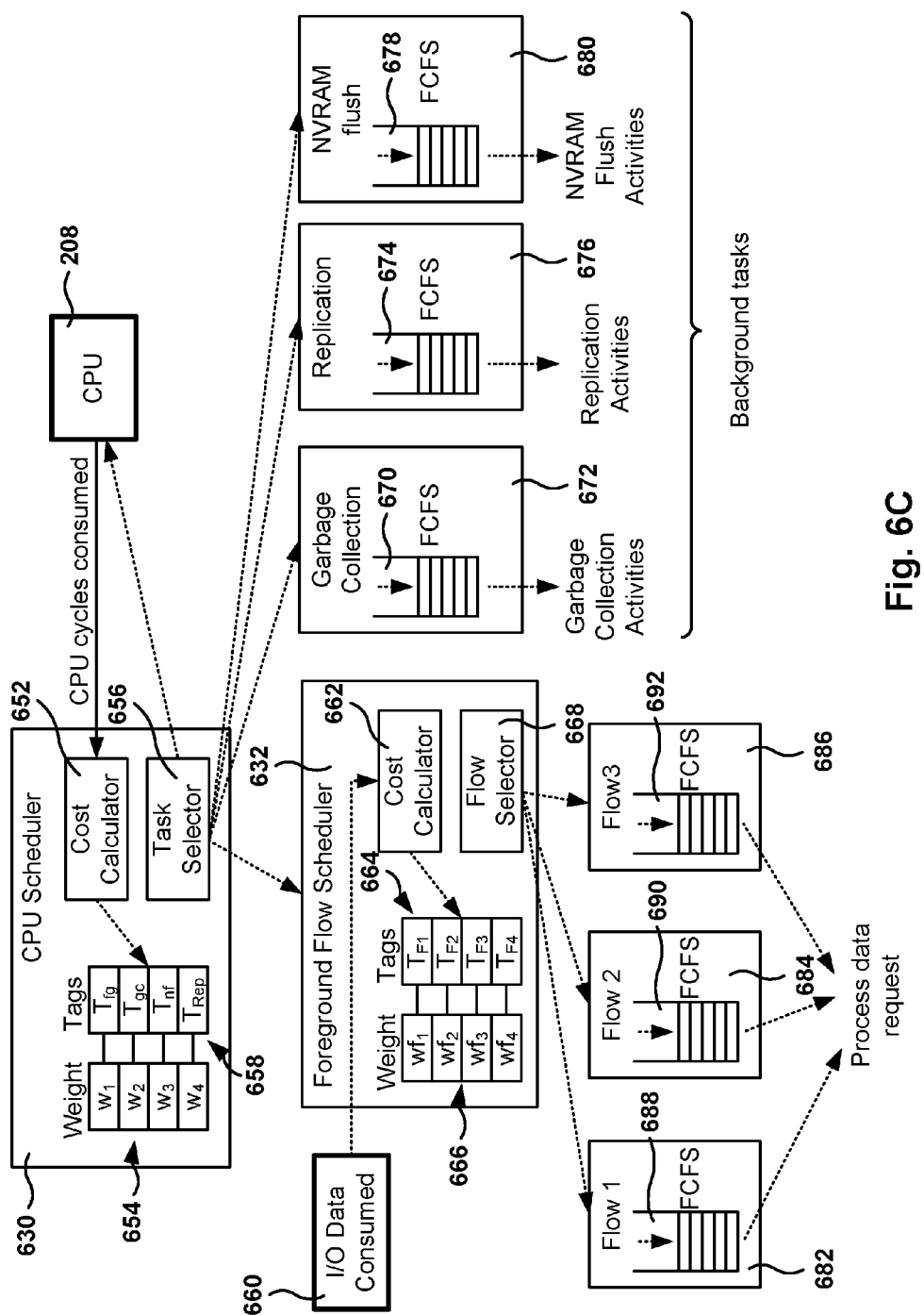
FIG. 6C illustrates a plurality of schedulers within the scheduling hierarchy, in accordance with one embodiment.

FIG. 6C illustrates a plurality of schedulers within the scheduling hierarchy, in accordance with one embodiment. In one embodiment, the root scheduler utilizes a Start-time Fair Queueing (SFQ) algorithm with CPU utilization as the cost metric. SFQ is a throughput allocation algorithm used for sharing a resource among multiple entities. For example, the different tasks in the storage array are the entities being selected by the CPU scheduler for the processing of their respective requests.

Whenever an entity uses the resource, the entity is charged with a cost. The charge is a function of the amount of resource consumed (e.g., CPU cycles) and a weight $w_i$ associated with the entity. In one embodiment, each entity has a queue and an accumulated charge, referred to herein as the tag, and when the scheduler is deciding which entity to schedule next, the active entity with the least accumulated charge is selected.

A queue is considered active, if the queue has at least one outstanding request to be processed. Otherwise the queue is idle. A tag is associated with every active queue for tracking the accumulated charge. When a queue from entity i becomes active from idle, the initial tag $t_i$ for the entity i is calculated as follows:

$$t_i = \max(t_i', \min(\text{tags for all active queues})) \quad (1)$$

Where $t_i'$ is the previous value of $t_i$. Basically, equation (1) is used to normalize the tag with respect to the active queues. This ensures that an active queue is not penalized for using bandwidth when other queues were idle and the system had excessive bandwidth, thereby accumulating a large tag value.

When it's time for the scheduler to select the next task, the active queue with the smallest tag $t_i$ is selected. The scheduled entity is then charged an amount $ch_i$ calculated as follows:

$$ch_i = \text{cost}(p)/w_i \quad (2)$$

Where cost(p) is the CPU cycles consumed by the selected task and $w_i$ is the weight of the selected entity i. The tag of the entity i is then updated with the charged amount as follows:

$$t_i = t_i' + ch_i \quad (3)$$

The weigh $w_i$ indicates the relative importance of each queue or entity. For example, for the same amount of CPU cycles consumed, a queue with a weight of 4 will be charged half than a queue with a weight of 2. If just two entities with the same weight are running, then both entities will get 50% of the CPU.

In one embodiment, it is desirable to give some head start to a queue that just turned active from idle. To achieve this, a delta value is subtracted to $t_i$ to a queue that just became active after a threshold period. Equation (1) is adjusted as follows:

$$t_i = \max(t_i', (\min(\text{tags for all active queues}) - \text{delta})) \quad (4)$$

The delta value represents a head start or advantage given to a queue that just became active. This delta value is also referred to as an idle boost. The delta value is configurable by the designer and can be changed over time based on the performance of the system and the desired level of idle boost to be given to new active tasks.

With reference to CPU scheduler 630, the CPU scheduler uses an SFQ algorithm with weights 654 for each of the tasks 658 in the first level of the hierarchical scheduler. The cost calculator 652 keeps track of charges and tags (e.g., $T_{fg}$, $T_{gc}$, $T_{nf}$, $T_{Rep}$), as described above with reference to equations (1)-(4). The Task Selection module 656 then determines which task is selected when it's time to select a new task, based on the tags 658 for all the active tasks.

As previously discussed, in one configuration, any task that is not in the latency path for foreground IO is a background task. The foreground flow scheduler 632 is given a weight $w_1$, and other background tasks are given respective weights (e.g., $w_2$, $w_3$, $w_4$, . . . ) (e.g., 4, 2, 2, 1). In one embodiment, based on the resource consumption in the system, the weights of certain background tasks may be modified dynamically.

In one embodiment, the foreground flow scheduler also utilizes an SFQ algorithm but the cost allocated to running entity is based on the amount of IO data consumed 660 by each of the flows 664 $F_1$, $F_2$, $F_3$, . . . . The cost calculator 662 determines the cost allocated to each flow based on the amount of IO data consumed by that flow.

Therefore, there is a first level scheduler 630 utilizing a first currency for scheduling, the amount of CPU 208 consumed. At the second level, for scheduling flows, there is a second level scheduler 632 utilizing data consumed by an executed task.

Other schedulers, such as garbage collection 672, replication task 676, NVRAM flush 680 utilize first-come first-served (FCFS) selection algorithms. Each of the schedulers included a queue 670, 674, 676 holding the tasks waiting for processing. To ensure fairness between foreground workloads, all IO requests belonging to a workload need to be identified and associated with a single logical identity, and then each such logical entity can be subjected to fair CPU scheduling. That logical entity is the flow. A flow maps to a LUN, or to a volume, or to a virtual volume.

In one embodiment, there are two possible configurations for a flow. First, multiple protocol connections per flow. An iSCSI single LUN per session/connection scenario, where protocol connections represent iSCSI sessions to a LUN from a host. Here, the flow represents a volume, and all requests for a volume, received on multiple protocol connections, belong to the same flow that represents the volume.

A second possible configuration includes multiple flows per single protocol connection. In a scale out forward connection scenario, a single forward connection can have IO requests from different hosts to different volumes, and a flow represents a volume. All requests for a volume, received on one or more forward connections, belong to the same flow that represents the volume. Further, a forward connection may carry requests belonging to different flows.

Cost calculator 662 of foreground flow scheduler 632 measures bytes generated (i.e., consumed) by each of the flows for read and write operations. The flow selection module 668 selects which of the active flow schedulers will be given the CPU next, using an SFQ algorithm as described above, but using data consumed as the cost metric instead of CPU cycles consumed. Once any of the flows are selected by the flow scheduler 632, the respective flow scheduler 682, 684, 686 is selected, and then the selected flow scheduler will select an IO request to be executed using an FCFS algorithm. Other embodiments may utilize other scheduling algorithms other than FCFS.

In one embodiment, three different ways of calculating cost may be used. First, a fixed upfront constant cost is assigned. This fixed cost is charged upfront when the entity is selected. Second, a variable upfront cost. When a schedulable entity is selected, its cost is known before its execution based on the type of entity. For example, the IO request size is used as the variable upfront cost for admitting the request. Third, a fixed upfront cost plus a deferred variable adjustment. When it is not possible to find out the true cost of a schedulable entity before its execution, the entity is charged a constant amount upfront. During execution, the actual cost is measured and any delta from the upfront cost is incorporated into the next scheduling cycle. The reason for the upfront constant cost is to avoid unfairness that may arise if no cost is incurred by the schedulable entity at the time of selection.

It is noted that the embodiments illustrated in FIG. 6C are exemplary. Other embodiments may utilize different types of schedulers (e.g., prioritized tasks within a flow), include other types of background tasks, etc. The embodiments illustrated in FIG. 6B should therefore not be interpreted to be exclusive or limiting, but rather exemplary or illustrative.

Figure 7:
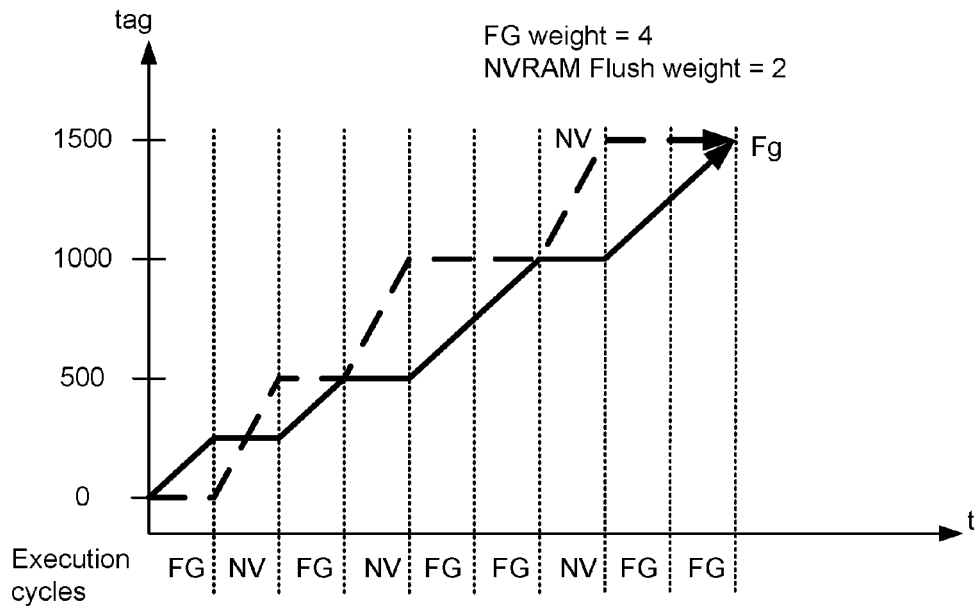
FIG. 7 illustrates the assignment of CPU time to two different tasks based on their respective scheduling weights, according to one embodiment.

FIG. 7 illustrates the assignment of CPU time to two different tasks based on their respective scheduling weights, according to one embodiment. In the example of FIG. 7, there are two tasks competing for CPU allocation. The first task is the foreground flow scheduler FG and the second task is a background task, namely NVRAM flushing NV.

FG has a weight $w_f$ of 4 in the CPU scheduler, and NV has a weight $w_n$ of 2. Initially the tags $t_f$ and $t_n$ for both of them are zero. For this example, each of the tasks consumes 1000 cycles of CPU each time the task is executed. Initially, since both of them have the same tag, the scheduler selects one of them at random. In this case, the scheduler selects the foreground task FG. The tag $t_f$ is charged with 250 cycles (1000 cycles divided by the weight $w_f$ of 4).

In the next selection, the scheduler selects NV because it has a smaller tag (0 versus 250). NV runs for 1000 cycles, and $t_n$ is increased by 500 (1000 divided by 2). In the next cycle $t_f$ is smaller than $t_n$ (250<500) so FG is selected and executed. $t_f$ is updated to 500. The process continues, and the tags continue being updated. As it can be observed from the chart in FIG. 7, in every three cycles, two cycles are assigned to FG and one cycle is assigned to NV. This is the consequence of the weight of NV $w_n$ being twice as much as the weight of FG $w_f$.

Figure 8:
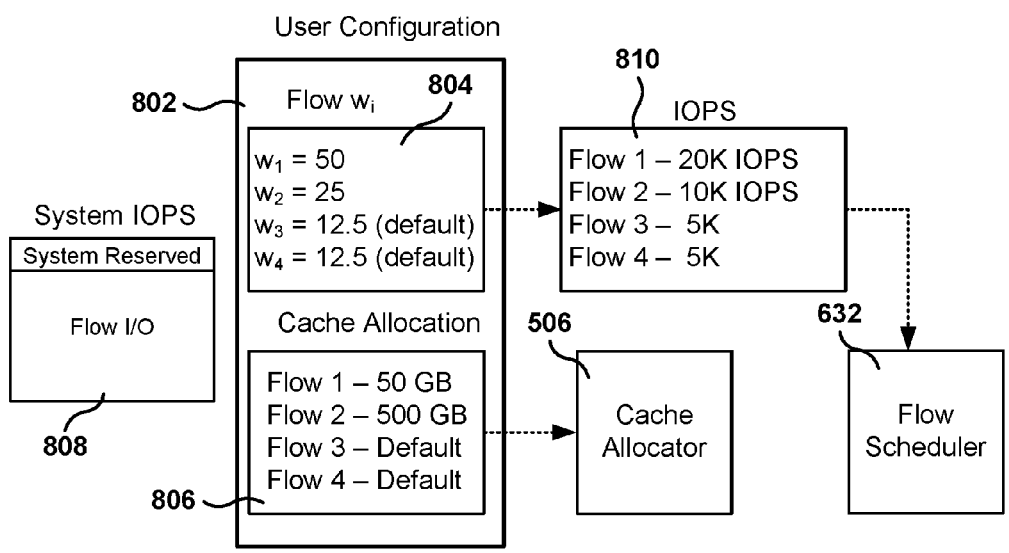
FIG. 8 illustrates the relationship between the user configured parameters and the scheduler parameters, according to one embodiment.

FIG. 8 illustrates the relationship between the user configured parameters and the scheduler parameters, according to one embodiment. In one embodiment, the user is given an interface for configuring the desired performance for the different flows. The storage array primary user is a storage administrator, and the storage administrator creates volumes, which are groups of data blocks that an application may access.

In one embodiment, the user configuration 802 includes configuration regarding the relative performance between flows 804, and cache allocation 806. The cache may be either pinned or unpinned. Pinning a volume means that the volume will have all its data blocks cached, a very expensive operation as the performance of other volumes may significantly be degraded if not enough cache is available.

If a volume is unpinned, the volume may be configured with a cache reserve, e.g., a guaranteed amount of space in the cache. For example, a volume may have a size of 10 TB, but the application only accesses 1 TB at any point in time. Therefore, the storage administrator may configure this application with 1 TB of cache.

The flow relative performance may be configured in any way that provides priorities between the flows. In one embodiment, the flow performance is specified in relative weights which are used directly, or scaled, for the SFQ algorithm (e.g., 50, 25, 12.5, and 12.5). A default weight is defined for flows with unspecified requirements, while other flows may be configured with a certain number of IOPS. In the exemplary embodiment of FIG. 8, Flow 1 has been configured with $w_1$=50, Flow 2 with $w_2$=25, and Flows 3 and 4 with default values of 12.5.

In one embodiment, the configured weight values are translated into input/output operations per second (IOPS) delivered for each flow. For example, if the storage array has reserved 40K IOPS for the four flows, the IPOS delivered for the respective flows will be 20K, 10K, 5K, and 5K. Since higher performance requires smaller charge amounts by the SFQ scheduler, the weight values $w_i$ are directly proportional to the IOPS value.

If the system can deliver more IOPS that the ones reserved by the different volumes, a volume may be configured with a percentage of the "unclaimed" performance (not shown). This is useful when there are multiple volumes of multiple applications concurrently executing in the storage array.

In one embodiment, in order to ensure that the system performs adequately, a certain number of system IOPS 808 are reserved by the array while the remainder of the available IOPS are assigned to the different flows. User configuration 802 can also include desired cache allocation for the different flows, which is used by the cache allocator 506. For example, Flow 1 has pinned 50 GB of cache memory, while other flows may not define a specific cache memory, leaving up to the storage array to allocate the adequate amounts of cache storage.

Figure 9B:
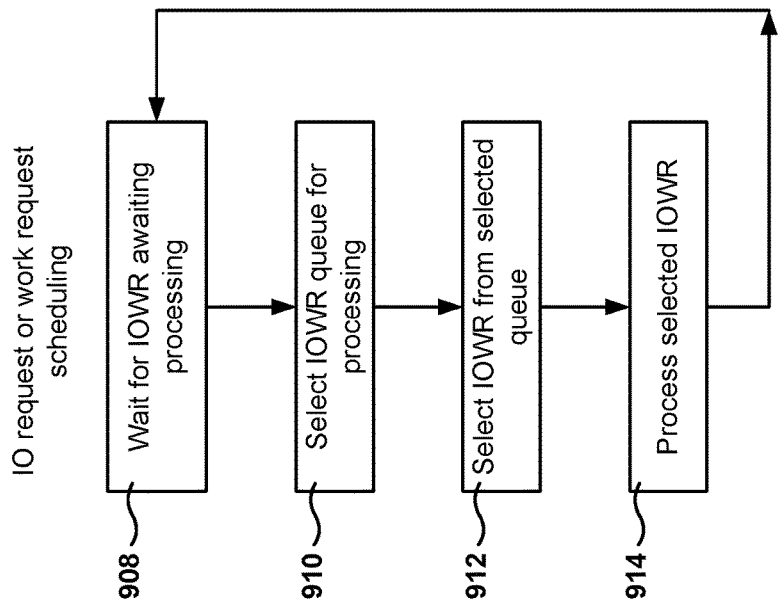
FIG. 9B is a flowchart for scheduling work requests and Input/Output (IO) requests, according to one embodiment.
Figure 9A:
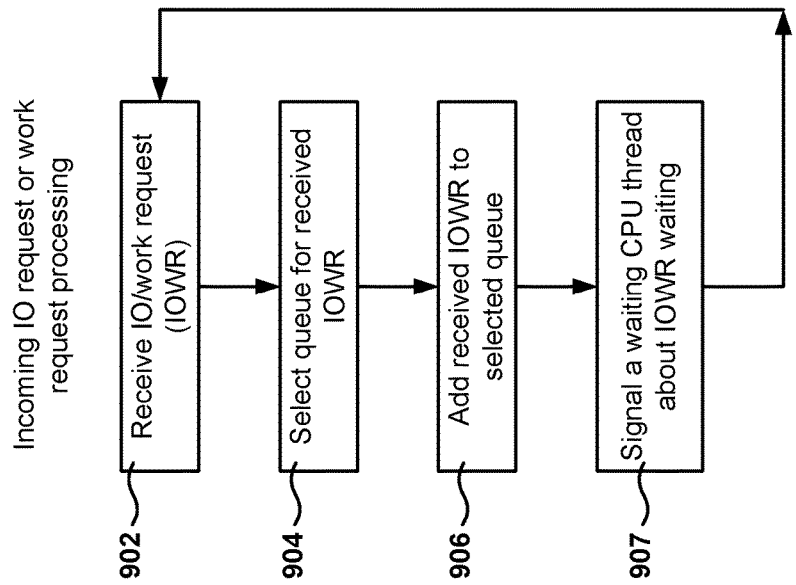
FIG. 9A is a flowchart for processing incoming IO or work requests, according to one embodiment.

FIG. 9A is a flowchart for processing incoming IO requests or work requests, according to one embodiment. While the various operations in this flowchart are presented and described sequentially, one of ordinary skill will appreciate that some or all of the operations may be executed in a different order, be combined or omitted, or be executed in parallel.

As used herein, the smaller unit of work is called a request, which can be an IO request to satisfy an IO operation, or a work request (WR) to perform an operation for a background task. For description purposes a generic request is referred to herein as an IO request or a work request (IOWR). When processing IOs, the requests may be blocked (i.e., suspended) temporarily until they can be served. Further, to complete an IO request, several tasks may have to be completed. For example, for a read path, first an attempt is made to read from RAM cache, if not read from SSD, and if not read from HDD. Each operation may be a different request that needs to be scheduled. For example, when a read from hard disk is requested, the task gives up the CPU until the hard disk access is completed.

At one point in time, a storage array could be processing hundreds of thousands of IOs per second (IOPS), which means that if each IO had a thread running, the storage array would have to manage that many threads. Possibly, the CPU could not keep up with that many threads, resulting in the collapse of the storage array, and not been able to schedule the required tasks.

In one embodiment, one thread is created for each CPU core and these threads are constantly running. For example, the storage array may have a CPU with 4 cores, 8 cores, 12 cores, 24 cores, 32 cores, 40 cores, etc., which would mean the same amount of running threads. Those threads are referred to herein as worker threads.

In one embodiment, the root scheduler, or the root scheduler in cooperation with other schedulers, adds new requests to the corresponding queues, as seen in FIG. 6C. When a thread is idle, the thread asks the scheduler to give the thread the next waiting IOWR, and then the thread processes the allocated IOWR.

Regarding incoming IO or work-request processing, in operation 902 a new IOWR is received. From operation 902, the method flows to operation 904 where a queue is selected for the received IOWR. The queue holds IOWRs until the IOWRs can be processed by the CPU. From operation 904, the method flows to operation 906 where the received IOWR is added to the selected queue. From operation 906, the method flows to operation 907 where the scheduler signals a waiting CPU thread about the IOWR waiting for processing.

FIG. 9B is a flowchart for scheduling IO requests or work requests, according to one embodiment. In operation 908, the scheduler waits for an IOWR. In one embodiment, after a worker thread finishes processing an IOWR, the worker thread asks the scheduler for the next IOWR. In one embodiment, the worker thread runs the scheduler code to get the next IOWR.

In operation 910, the scheduler selects the queue to be processed next. As discussed above with reference to hierarchical scheduling, the selection of the IOWR to be processed next may involve the action of one or more schedulers. For example, the CPU scheduler may select the foreground flow scheduler, the foreground flow scheduler may select one of the flow schedulers of flows waiting for service, and then the flow scheduler will select one of the queued IOWRs.

From operation 910, the method flows to operation 912 where the IOWR is selected from the queue selected in operation 910 (e.g., the queue of a flow scheduler, the queue of the garbage collection background task, etc.). In operation 914, the selected IOWR is processed.

Figure 10A:
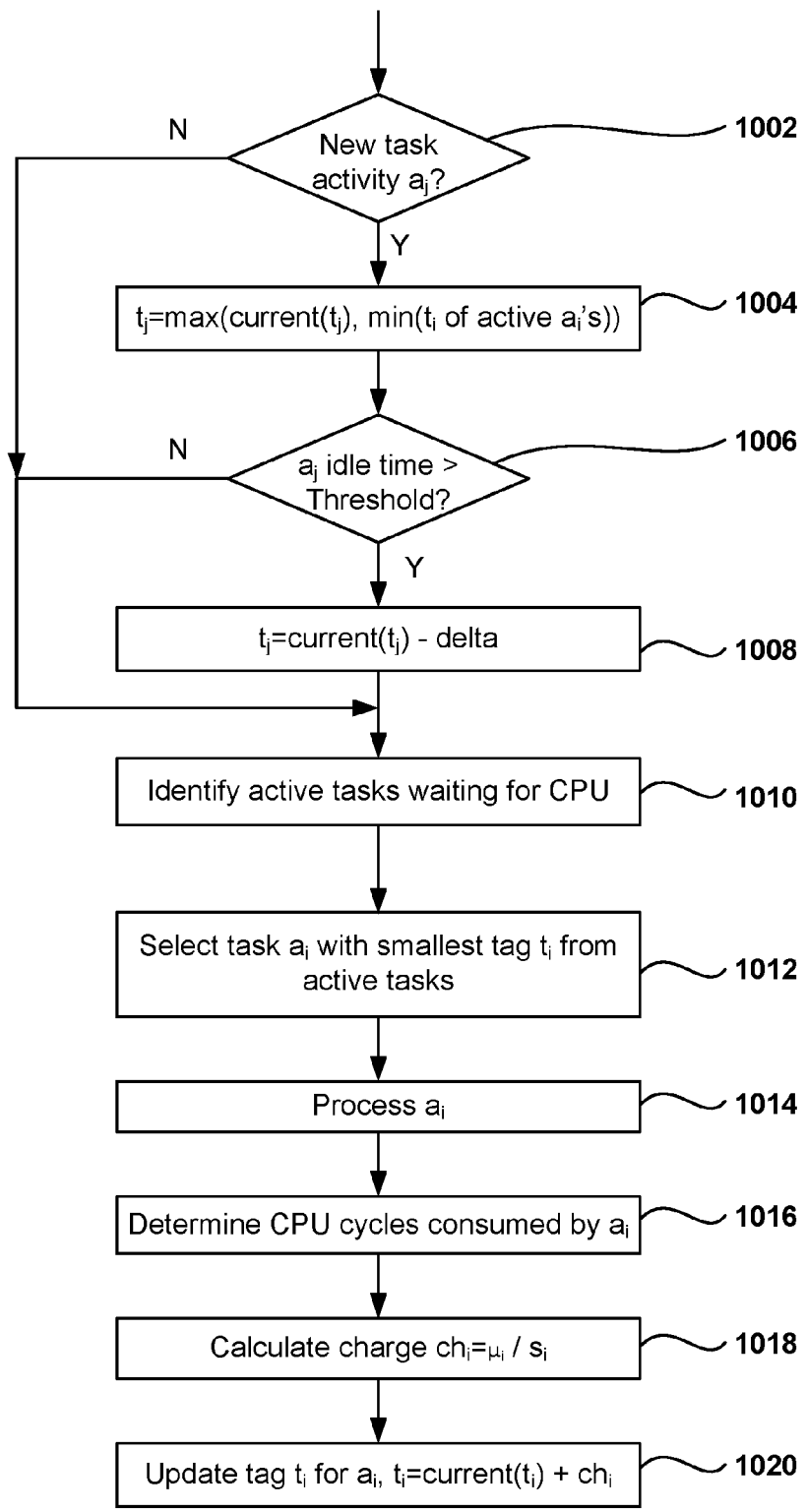
FIG. 10A is a flowchart for scheduling tasks based on their respective weights and the CPU cycles consumed, according to one embodiment.

FIG. 10A is a flowchart for scheduling requests based on their respective weights and the CPU cycles consumed, according to one embodiment. The flowchart of FIG. 10A describes operations related to an SFQ algorithm used by the root scheduler to select a task. In other embodiments, other operations may be used by the root scheduler to select tasks, e.g., a scheduler that selects tasks based on the relative priorities assigned to different tasks, or any other type of algorithm. It is noted, that the same principles may be utilized by the flow scheduler for selecting flows using an SFQ algorithm.

While the various operations in this flowchart are presented and described sequentially, one of ordinary skill will appreciate that some or all of the operations may be executed in a different order, be combined or omitted, or be executed in parallel. In operation 1002, a check is made to determine if a new task $a_j$ has become active. If there is a new task, the method flows to operation 1004, and to operation 1010 otherwise. In operation 1004, the tag $t_j$ of task $a_j$ is updated utilizing equation (1) described above $[t_i=\max(t_i', \min(\text{tags for all active queues}))]$.

From operation 1004, the method flows to operation 1006 where a check is made to determine if task $a_j$ was idle for a period greater than a threshold period. If $a_j$ was idle for a period greater than the threshold period, then the method flows to operation 1008 where the tag $t_j$ of task $a_j$ is adjusted according to equation (4) described above $[t_i=\text{current}(t_j)-\text{delta})]$.

From operation 1008, the method flows to operation 1010 where the tasks waiting for CPU time are identified, e.g., tasks having IOWRs waiting to be scheduled are identified. From operation 1010, the method flows to operation 1012 where a task $a_i$ is selected having the smallest tag $t_i$ from all active tasks. As used herein, an active task is a task that has one or more IOWRs waiting to be assigned processing by the CPU.

In operation 1014, the selected task $a_i$ is processed. As described above, the processing of task $a_i$ may involve the selection of an IO request from a foreground workload or a WR from a background task, and then processing by the CPU of that IOWR. From operation 1014, the method flows to operation 1016 where a determination is made on how many cycles of CPU were consumed to execute the IOWR of task $a_i$.

In operation 1010, the charge $ch_i$ is calculated, as described above in equation (2) $[ch_i=\text{cost}(p)/w_i]$, where cost(p) for task $a_i$ is referred to as $\mu_i$. From operation 1018, the method flows to operation 1020, where the tag $t_i$ is updated as described above with reference to a equation (3) $[t_i=t_i'+ch_i]$.

In one embodiment, the weights $w_i$ for the different tasks are dynamically adjusted to improve system performance. As the system processes incoming IO requests, resource consumption (e.g., NVRAM data pages, disk space etc.) increases. One goal of the CPU scheduler is to increase the relative importance of background tasks that generate free resources. In order to do this, resource utilization is monitored, and the weights are adjusted based on resource utilization. Individual tasks weights are calculated based on resource utilization. For example, as utilization increases, the weight can increase linearly or quadratically, but within bounds. And when the resource utilization decreases, the weight decreases back to its original value.

Figure 10B:
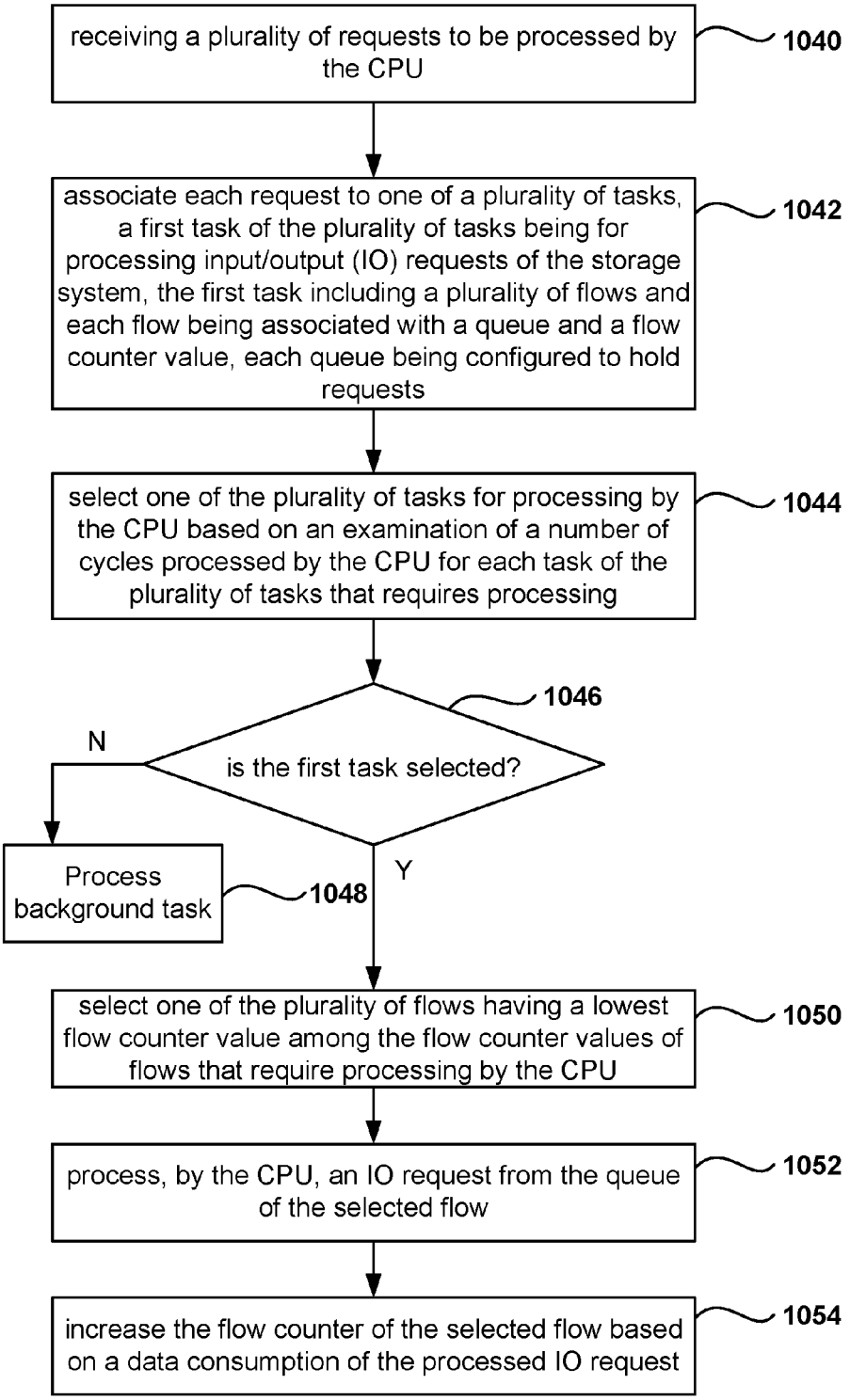
FIG. 10B is a flowchart of a method for allocating cycles of a CPU (central processing unit) of a storage system, according to one embodiment.

FIG. 10B is a flowchart of a method for allocating cycles of a CPU (central processing unit) of a storage system, according to one embodiment. While the various operations in this flowchart are presented and described sequentially, one of ordinary skill will appreciate that some or all of the operations may be executed in a different order, be combined or omitted, or be executed in parallel.

In operation 1040, a plurality of requests to be processed by the CPU is received. From operation 1040, the method flows to operation 1042 where each request is associated to one of a plurality of tasks. A first task of the plurality of tasks is for processing input/output (IO) requests of the storage system, referred to herein as a foreground task. The first task includes a plurality of flows and each flow is associated with a queue and a flow counter value, where each queue is configured to hold requests.

From operation 1042, the method flows to operation 1044 for selecting one of the plurality of tasks for processing by the CPU, based on an examination of a number of cycles processed by the CPU for each task of the plurality of tasks that requires processing. A task that requires processing is referred to herein as an active task.

From operation 1044, the method flows to operation 1046 where a check is made to determine if the first task was selected in operation 1044. If the first task was selected the method flows to operation 1050, and if the first task was not selected the method flows to operation 1048 where a background task is processed.

In operation 1050, the flow of the plurality of flows having the lowest flow counter value, among the flow counter values of flows that require processing by the CPU, is selected. From operation 1050, the method flows to operation 1052 for processing, by the CPU, an IO request from the queue of the selected flow. In operation 1054, the flow counter of the selected flow is increased based on a data consumption of the IO request processed in operation 1052.

Figure 11:
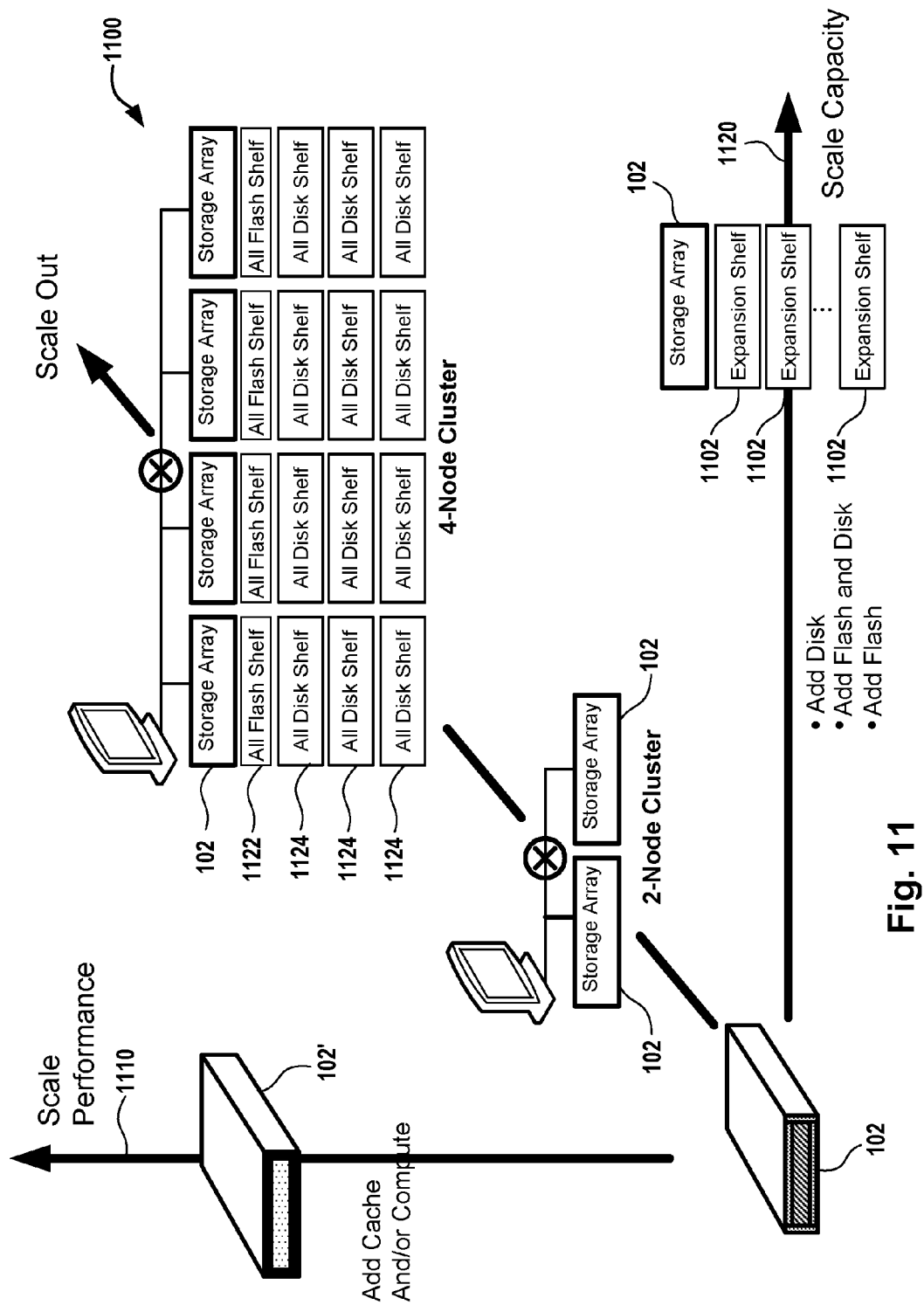
FIG. 11 is an example of the flexibility of the storage array, which can be expanded for scaling performance and for scaling capacity.

FIG. 11 is an example 1100 of the flexibility of the storage array 102, which can be expanded for scaling performance 1110 and for scaling capacity 1120. In this illustration, the storage array can be adjusted to add cache and/or compute resources to define a more powerful storage array 102'. In one example, instead of upgrading the storage array 102, an upgraded storage array 102 can take its place to provide additional processing power (e.g., more powerful CPUs, higher capacity NVRAM, higher capacity DRAM, improved storage enclosure routing and buses, improved fan speeds, modified enclosure (e.g., chassis) heights (U1, U2, U3, etc.), different power supplies, and/or other redundancy and/or memory and/or processing infrastructure.

In one embodiment, if the storage array requires additional disk or storage or flash storage memory, the storage array can be expanded to scale out 1120 by adding expansion shelves 1102 to the storage array 102. As discussed above, the expansion shelves 1102 may be defined by all-disk shelves (ADS) or all-flash shelves (AFS), or combinations of ADS and AFS shelves In a further example, the flexibility of the storage array 102 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1122 and various all-disk shelves 1124. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 11.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 102, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for allocating cycles of a CPU (central processing unit) of a storage system, comprising:
   receiving a plurality of requests to be processed by the CPU;
   associating each request to one of a plurality of tasks, a first task of the plurality of tasks being for processing input/output (IO) requests of the storage system, the first task including a plurality of flows and each flow being associated with a queue and a flow counter value, each queue being configured to hold requests;
   selecting one of the plurality of tasks for processing by the CPU based on an examination of a number of cycles processed by the CPU for each task of the plurality of tasks that requires processing;
   when the selected task is the first task, selecting one of the plurality of flows having a lowest flow counter value among the flow counter values of flows that require processing by the CPU; and
   processing by the CPU a request from the queue of the selected flow, the flow counter of the selected flow being increased based on a data consumption of the processed request;
   wherein each flow of the plurality of flows is associated with a respective volume, wherein each volume is configured from one or more storage arrays, and wherein two or more storage arrays are defined as part of a clustered storage array.

2. The method of claim 1, wherein the flow counter value of the selected flow is increased based on a weight assigned to the flow and the data consumption for the processed task.

3. The method of claim 2, wherein the weight assigned to each of the plurality of flows is directly proportional to an input/outputs per second (IOPS) delivered for each of the plurality of flows.

4. The method of claim 1, wherein the requests to be processed are scheduled for processing based on a dual currency that includes (a) a number of CPU cycles used by each task and (b) the flow counter values of the plurality of flows.

5. The method of claim 1, wherein the data consumption of the processed request is based on a size of a read or write request of the processed request.

6. The method of claim 1, wherein each request is one of an IO request or a work request for a background task.

7. The method of claim 1, further including:
   detecting an activated flow that requires CPU processing, the activated flow having been idle for a period of time greater than a threshold period; and
   adjusting the flow counter value of the activated flow to be equal to a maximum between a current value of the flow counter value of the activated flow and a minimum flow counter of all active flows.

8. The method of claim 1, wherein each of the plurality of tasks is assigned a task weight that that is used to increase a task counter value, wherein selecting one of the plurality of tasks further includes:
selecting the task with a lowest task counter value among the task counter values of tasks that require processing by the CPU.

9. The method of claim 8, wherein the task counter value of the selected task is increased based on an amount of CPU cycles consumed by a processed task associated with the selected task and based on the assigned task weight for the selected task.

10. The method of claim 1, wherein each volume is configured from one or more storage arrays; and
wherein a pool is configured for each volume, each volume defined from the storage system defined by one or more storage arrays.

11. The method of claim 1, wherein a performance metric defined by input/outputs per second (IOPS) is assigned to each of the flows, wherein a weight assigned to each of the flows is directly proportional to the respective TOPS of the flow.

12. The method of claim 11, wherein the performance metric assigned to each volume is a portion of available performance assignable for processing IO requests to the plurality of flows.

13. The method of claim 11, wherein each flow of the plurality of flows is associated with a volume to be serviced by the storage system, wherein based on anticipated storage demands by volume the performance metric assigned to the volumes is configurable.

14. The method of claim 13, wherein performance metrics assigned to specific volumes define a guaranteed amount of reserved IOPS.

15. A storage system comprising:
a central processing unit (CPU);
a non-volatile memory (NVRAM) for storing incoming write requests;
a solid state memory (SSD) configured as a read cache memory; and
a hard drive (HDD) for permanent data storage, wherein the CPU:
associates requests requiring processing by the CPU to one of a plurality of tasks, a first task of the plurality of tasks being for processing input/output (IO) requests of the storage system, the first task including a plurality of flows and each flow being associated with a queue and a flow counter value, each queue being configured to hold requests;
selects one of the plurality of tasks for processing by the CPU based on an examination of a number of cycles processed by the CPU for each task of the plurality of tasks that requires processing;
when the selected task is the first task, selects one of the plurality of flows having a lowest flow counter value among the flow counter values of flows that require processing by the CPU; and
processes a request from the queue of the selected flow, the flow counter of the selected flow being increased based on a data consumption of the processed request;
wherein a weight assigned to each of the plurality of flows is directly proportional to an input/outputs per second (IOPS) delivered for each of the plurality of flows.

16. The storage system of claim 15, wherein the CPU includes a plurality of cores, wherein the request to be processed is assigned to a thread executing in one of the plurality of cores.

17. The storage system of claim 15, wherein the CPU further:
detects an activated flow that requires CPU processing, the activated flow having been idle for a period of time greater than a threshold period; and
adjusts the flow counter value of the activated flow to be equal to a maximum between a current value of the flow counter value of the activated flow and a minimum flow counter of all active flows.

18. The storage system of claim 15, wherein each of the plurality of tasks is assigned a task weight that that is used to increase a task counter value, wherein to select one of the plurality of tasks, the CPU further:
selects the task with a lowest task counter value among the task counter values of tasks that require processing by the CPU.

19. A non-transitory computer-readable storage medium storing a computer program for allocating cycles of a CPU (central processing unit) of a storage system, the computer-readable storage medium comprising:
program instructions for receiving a plurality of tasks to be processed by the CPU;
program instructions for associating each request to one of a plurality of tasks, a first task of the plurality of tasks being for processing input/output (IO) requests of the storage system, the first task including a plurality of flows and each flow being associated with a queue and a flow counter value, each queue being configured to hold requests;
program instructions for selecting one of the plurality of tasks for processing by the CPU based on an examination of a number of cycles processed by the CPU for each task of the plurality of tasks that requires processing;
program instructions for, when the selected task is the first task, selecting one of the plurality of flows having a lowest flow counter value among the flow counter values of flows that require processing by the CPU; and
program instructions for processing by the CPU a request from the queue of the selected flow, the flow counter of the selected flow being increased based on a data consumption of the processed request;
wherein each of the plurality of tasks is assigned a task weight that is used to increase a task counter value, wherein selecting one of the plurality of tasks further includes, program instructions for selecting the task with a lowest task counter value among the task counter values of tasks that require processing by the CPU, the task counter value of the selected task is increased based on an amount of CPU cycles consumed by a processed request associated with the selected task and based on the assigned task weight for the selected task.

20. The non-transitory computer-readable storage medium of claim 19, wherein the flow counter value of the selected flow is increased based on a weight assigned to the flow and the data consumption for the processed task.

* * * * *